April 28, 1925.

H. R. HAYS ET AL

CAMERA

Filed Nov. 28, 1921

Inventors
HOWARD R. HAYS
WILLIAM CORNELISSEN

By their Attorney

INVENTORS
HOWARD R. HAYS
WILLIAM CORNELISSEN
BY
their ATTORNEY

Patented Apr. 28, 1925.

1,535,225

UNITED STATES PATENT OFFICE.

HOWARD R. HAYS AND WILLIAM CORNELISSEN, OF PHILADELPHIA, PENNSYLVANIA, ASSIGNORS TO HOWARD S. LEVY AND LIONEL F. LEVY, BOTH OF PHILADELPHIA, PENNSYLVANIA.

CAMERA.

Application filed November 28, 1921. Serial No. 518,184.

*To all whom it may concern:*

Be it known that we, HOWARD R. HAYS, a citizen of the United States, and WILLIAM CORNELISSEN, a citizen of Holland, residing at Philadelphia, in the county of Philadelphia and State of Pennsylvania, have invented certain new and useful Improvements in Cameras, of which the following is a specification.

This invention relates generally to photographic apparatus used in connection with process cameras and has reference more particularly to improvements in the construction and arrangement of an adjustable screen holder, operating mechanism for imparting uniform parallel movement to the front box of the camera with respect to the plateholder and focusing glass, and a light proof adjustable lensboard mounting enclosed within the front box and controlled from a remote point in the camera.

In cameras of this character, where exact alignment between the screen and the sensitive plate is an absolute necessity, more or less adjustment of the screen holder must be made, and, as such cameras are now constructed, before the adjustment may be made the plateholder is first removed from the camera. This is not desirable principally because the proper relation between the two members may be more readily determined while the plateholder is in position than with it removed. The invention, therefore, contemplates the use of such mechanism as will facilitate relative adjustment of the screen holder without the need of removing the plateholder from the camera.

Exact precision in the operation of the front box with respect to the back box of such apparatus is also of vital importance especially where matched plates may be required to be made at different times and after the position of the camera has been changed to do other work. It has been found therefore, that the operation of the front box by means of a centrally disposed screw extending throughout the entire length of the camera bed, a construction now in use, is not to be relied upon, owing mainly to the fact that such movement being performed at a point substantially midway of the width of the front box allows the latter to turn at a slight inclination to the axis of the camera bed and in so doing causes a more or less distorted projection of the subject upon the sensitive plate. Such uneven results are more often found in old cameras where the guides have become worn and there is considerable play between the moving parts. It is then, a further object of this invention to provide operating mechanism which will insure positive parallel movement of the front box relative to the back box and which may be controlled from a remote point in the camera.

In cameras of this general type as now constructed, it is the usual practice to mount the lensboard and the mechanism for operating the same on the outside of the front panel in the front box with the result that the mechanism itself projects considerably beyond the camera and on a plane substantially level with the camera bed. Such an arrangement not only leaves the mechanism exposed to cause possible injury to the operator, but materially limits the working capacity of the camera in that the maximum travel of the front box is blocked by the engagement of the projecting mechanism with the forward end member of the camera bed. In the present invention, it is a still further object to carry the adjustable mountings for the lensboard inside the front box and to so arrange the operating mechanism cooperating therewith that the latter will be entirely enclosed above and below the front box itself. With the mechanism so disposed the front panel of the forward box may be moved forward to engage with the end of the camera bed thereby increasing the enlarging capacity of the apparatus and at the same time remove possible danger of the operator becoming engaged in the gears.

The invention is fully described in the following specification and set forth on the appended claims, reference being had to the accompanying drawings, in which—

Figures 1, 2:
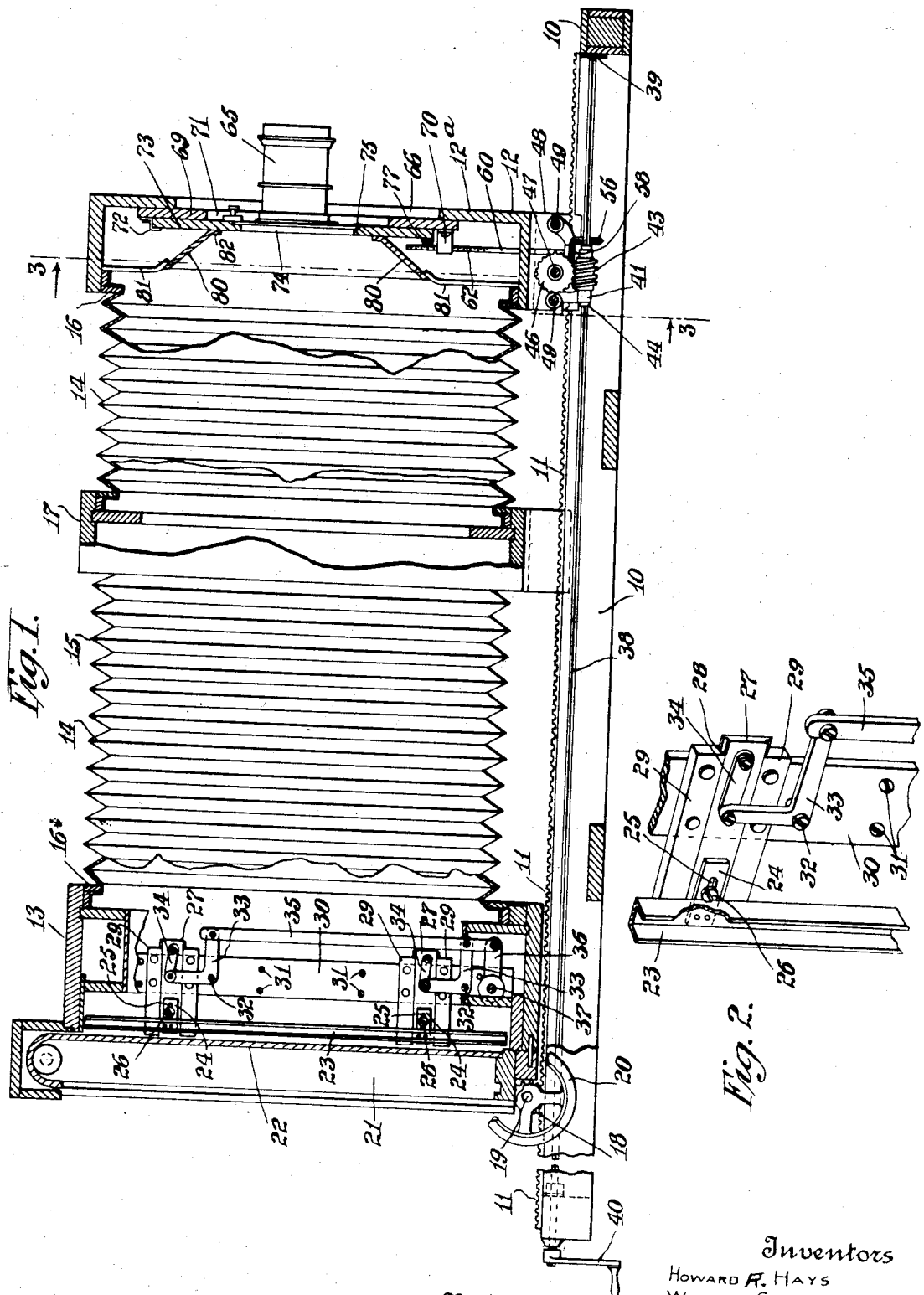
Fig. 1 is a substantially longitudinal sectional view of a process camera embodying the invention.
Fig. 2 is a detail perspective view of the upper portion of one of the adjustable screen supporting members.

Referring to the drawings, 10 denotes a rectangular camera bed frame, the longitudinally extending members of which are provided with toothed metal racks 11 secured to upper faces thereof and disposed in substantially parallel relation to one another. Mounted to travel over the racks 11 are the front and back boxes 12 and 13 respectively, each of which may be moved relatively to the camera bed 10 and also with respect to each other, as hereinafter described. The front box 12 comprises a rectangular wooden frame closed at its forward end by means of a front panel 12$^a$ and open at the opposite end to receive one end of a bellows 14. The bellows itself comprises an extensible accordion pleated central portion 15 secured at its opposite ends to rigid metal frames 16 adapted to seat in the open ends of the boxes 12 and 13. In Figure 1, an additional box like supporting member 17 is shown supporting the intermediate section of the bellows 14. This member 17 is used to hold the center portion of a very long bellows or, as in the present instance, it receives the opposite ends of two bellows which are used when the front box and back are widely separated.

The parts of the camera, thus far described, are those which are common to all apparatus of this character, except that the racks 11 extend the entire length of the frame 10 to provide a track for both the front and back boxes, while in most cameras, as now constructed, the racks do not extend beyond the possible field of movement of the back box.

The screen adjusting mechanism which is best shown in Figures 1 and 2 and which will now be described, is carried by the back box 13. Mounted in suitable bearings projecting below the lowermost corners of the box 13 and in mesh with the teeth of the racks 11 are a set of casters 18 having their rollers provided with gear teeth. The rear right hand caster (looking forward from the rear of the camera) is mounted on a shaft 19 projecting outwardly over the side of the bed frame 10 to receive a hand wheel 20 for operating the back box 13. Attachably supported upon the rear edge of the box 13 is a plateholder 21 having the usual slide curtain 22. Closely adjacent the path of movement of the curtain 22 and adjustable axially of the box 13 are the screen supporting channel pieces 23 disposed at opposite sides of the box and provided with aligned grooves to receive the edges of the screen (not shown). Each channel piece carries two forwardly projecting arms 24 spaced considerably apart from one another and provided with slots 25 to receive the stems of guide screws 26 which are mounted in threaded openings in a pair of slide bars 27 and which are adapted to be tightened against the arms 24 subsequent to relative adjustment of the latter to hold them rigidly to the slide bars 27. The slide bars 27 move in the grooves 28 of two pairs of guide members 29 which are secured to the upper and lower portions of bars 30 and which extend to the rear edge of the box 13. The bars 30, one on each side of the box, are secured to the opposite walls of the latter by wood screws 31. Slightly below each pair of guide members 29 and intermediate the width of the bars 30 is a pivot screw 32 adapted to pivotally support a bell crank lever 33, the vertically extending arm of which is pivotally connected to one end of a link 34 supported at its opposite end on a pivot pin carried by the slide bar 27 and the horizontal arm of which is linked to a vertically extending rod 35. The lower end of this rod 35 is pivoted to the free end of a crank arm 36 mounted on a transverse shaft 37 which extends between the upright walls of the box 13 and which projects through to the exterior thereof at one side to receive a lever arm (not shown). It will be noted that with this construction the screen may be adjusted relative to the plateholder and with respect to the slide bars 27 by removing the adjacent end of the bellows 14 from the box 13, and by releasing the screws 26 the channel pieces 23 may be adjusted to any desired position without disturbing the plateholder.

Figure 3:
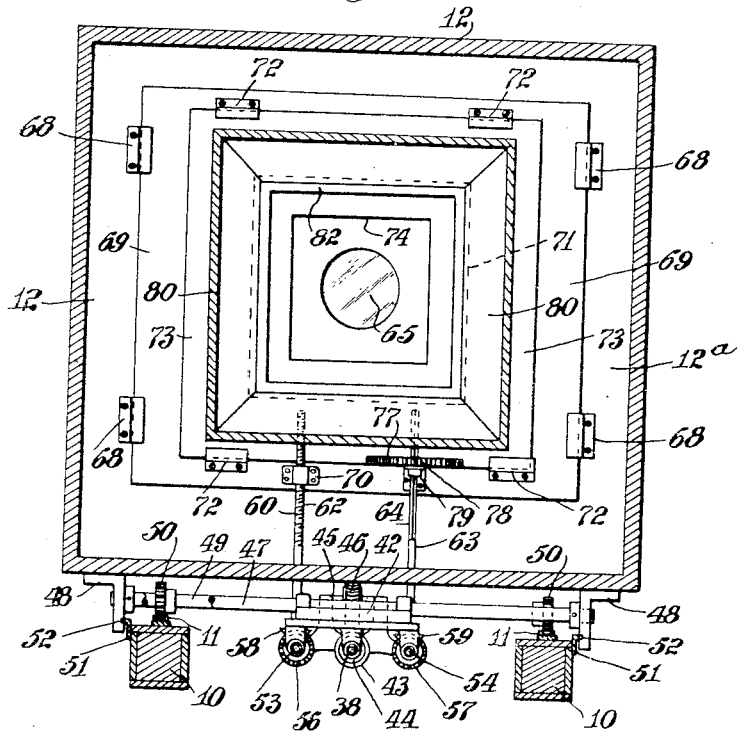
Fig. 3 is a substantially transverse sectional view of the front box of the camera taken on lines 3—3 of Figure 1.
Figure 4:
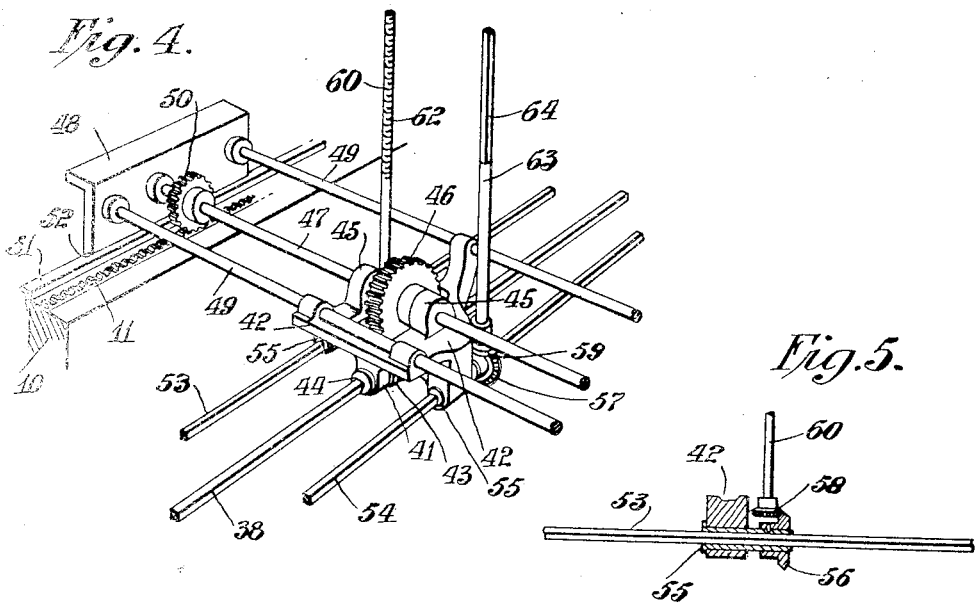
Fig. 4 is a detail perspective view of the mechanism for operating the lensboard mounts and for focusing with the front box.

In describing the mechanism for moving the front box 12, reference will be had particularly to Figures 1, 3 and 4. Projecting substantially the entire length of the frame 10, intermediate the width thereof and within close proximity of its upper face, is a square shaft 38 mounted at its forward end in a bearing 39 on the inner end portion of the frame 10 and at its other end the shaft 38 extends through the rear end of the frame 10 and receives a crank handle 40. Slidably mounted on the square shaft 38 and confined between the downwardly projecting forked bearing 41 of a casting 42 is a worm 43 which is provided with an interior bushing 44 having a square bore to receive the shaft 38. In mesh with the worm 43 and disposed between upwardly projecting forked bearing 45 is a worm wheel 46 keyed or otherwise fixed to a counter shaft 47 extending transversely of the camera and beneath the front box 12. The opposite ends of the shaft 47 are mounted in suitable bearings in a pair of angle pieces 48 secured to and projecting below the bottom wall of the box 12. A pair of tie rods 49, one at each side of the shaft 47, are secured at their opposite ends in the downwardly projecting portion of the angle pieces 48 and extend through openings in the casting 42. In Figures 3 and 4, it will be noted that the shaft 47 crosses the racks 11 at a plane substantially above that of the racks and in order to move the front box with relation to the camera bed 10 by the rotation of the square shaft 38 and the transverse shaft 47, a pair of toothed pinions 50 is keyed to the latter shaft, the pinions being keyed adjacent the opposite ends thereof, and directly in mesh with the racks 11. The forward box 12 is guided in its travel by means of small angle pieces 51 secured to the outside of the longitudinal members of the camera bed 10, the horizontal flanges of the said angles pieces 51 being adapted to engage with inside grooves 52 cut in the other angle pieces 48.

The lensboard mounts are operated from points in the camera bed disposed at each side of the shaft 38 and by means of two square shafts 53 and 54 which project rearwardly through the frame 10 and which are adapted to receive the crank handle 40. The forward ends of the shafts 53 and 54 are journaled in bearings disposed at each side of the bearing 39 at the front of the camera bed 10.

Figure 5:
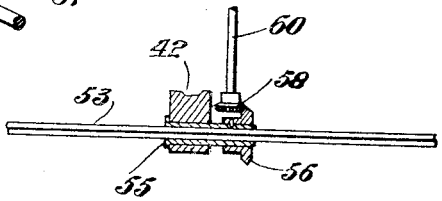
Fig. 5 is a sectional view of the gearing for operating the lensboard mounts.

Referring now to the mechanism for operating the lensboard mounts, particular reference will be had to Figures 3, 4 and 5, in which the shafts 53 and 54 cooperate with other mechanism to operate the vertically movable mount and the horizontally movable mount, respectively. Each shaft 53 and 54 extends through the square bores of a pair of loosely mounted bushings 55 which are journaled in depending lugs projecting from the casting 42 and which project substantially beyond the face of the lugs to support a pair of bevel gears 56 and 57, directly operated by the rotation of the shafts 53 and 54, respectively, meshing with a pair of upright bevel gears 58 and 59. Keyed at its lower end to the gear 58 and extending through a bearing in the casting 42 is an uprightly disposed spindle 60 which projects through the bottom wall of the front box 12 and which is provided with a continuous spiral thread 62 extending from the upper end thereof to a point slightly short of the wall of the box. In a similar manner the other bevel gear 59 is keyed to the lower end of a second upright spindle 63 which likewise extends through the bottom wall of the box 12 at a plane substantially parallel to the axis of the spindle 60 and which is provided with a square portion 64 extending from the upper end thereof to a point adjacent the bottom of the box. By the operation of these spindles 60 and 63 the proper centering of the lens may be made relative to the object to be photographed.

The front panel 12ª of the forward box 12 is provided with a square opening 66 through which the lens barrel 65 projects and at opposite sides of which are pairs of vertically disposed guides 68 having the grooves of each pair facing the grooves of the opposite pair. Slidably mounted in these grooves of the guide members 68 is the vertically movable mount or frame 69 which is held against the inside face of the panel 12ª by the guides themselves and which carries adjacent its lower edge a bracket 70 having a threaded bore to receive the threaded end of the spindle 60. The mount 69 also has a central square opening 71, slightly smaller than the opening 66 with which it registers, and is provided with two pairs of laterally disposed guides 72 arranged above and below the opening 71. Slidably mounted in the grooves of the guides 72 and held against the first mount 69 by the guides themselves is the horizontally movable lensboard mount or frame 73 which is provided with a square central opening 74 having a marginal depression or shoulder 75 in which the lensboard proper is seated and which carries a horizontally disposed rack 77 along its lower edge. Meshing with the teeth of the rack 77 is a pinion gear 78 supported in a bracket 79 carried by the first mount 69, the said pinion being provided with a square bore adapted to slide axially of the spindle 63, whereby when the latter is rotated through the operation of the shaft 54 by the handle 40 the pinion 78 will cause the rack 77 and mount 73 to move transversely across the axis of the camera.

In order to obstruct light rays, which may find their way into the interior of the front box 12 through any possible space between the relatively movable mounts for the lensboard, it has been found desirable to provide a shadow box 80 which comprises a rectangular frame the sides of which are inclined toward each other to provide a smaller opening in one end than in the other end and which is supported in brackets 81 mounted on the inside of the forward box 12. The smaller end of the shadow box 80 is provided with a flat flange 82 which is on a plane substantially at right angles to the axis of the box itself and which is adapted to be held lightly against the rear face of the mount 73. The size of the smaller opening in the shadow box 80 is determined by the relative movement of the two mounts with respect to the front box 12 and must be such as will permit full movement of the axis of the lens in either vertical or horizontal directions and still be within range of the opening defined by the flange 82. It might also be desirable to mount the shadow box 80 directly on the mount 73 so that the flange 82 would register with the edges of the opening 74. In such a construction the shadow box 80 would move with the mount 73 in a transverse direction with respect to the axis of the camera proper.

Before describing the operation of the several features set forth in the foregoing description, the following will suffice to explain the function of the shadow box 80. With reference to Figure 1, it will be noted that any light rays, which may enter the interior of the box 12 between the adjacent surfaces of the mounts 69 and 73 or through the openings in the bottom wall of the box for the spindles 60 and 63, will first strike against the walls immediately surrounding the mounts and will then be deflected at an angle equal to the angle at which the rays are projected, i. e. the inclination at which the light entered. Due to the close proximity of any of these possible avenues of light to the front wall 12ª the angle at which the light could project would be limited to a few degrees, in which case the angle of deflection would be so slight that the paths of the light rays would still remain within the box 12. With the deflected rays thus confined they would further engage the inclined outer surfaces of the shadow box 80, such surfaces being preferably coated with a dull black light absorbing material. Upon contact with these inclined surfaces what little strength may remain to the light will be rendered nugatory as the rays will be again deflected backwards away from all possible chance of finally striking the sensitive plate which it will be recalled is at the rear end of the bellows 14.

The operation of the invention will be briefly reviewed in the following:—Assuming that it is necessary to adjust the screen holders 23 at their upper ends to bring them into closer relation with the plate or plate holder 21, the latter may be moved transversely of the back box 13 in order to permit the use of a screw driver for the screws 26 or the rear end of the bellows 14 may be disengaged and the operator permitted to work through the open end of the back box 13. The screws 26 are then unscrewed in the upper slide members 27 and the arm 24 holding the screen supporting channel pieces 23 is adjusted towards the plateholder 21 until the desired position has been obtained. The same adjustment may be made on the other side of the box and the screws 26 again tightened. The simplicity with which this adjustment is made will be further appreciated when it is understood that heretofore it has not only been necessary to remove the plateholder from the back box 13, but the bars 30 have had to be shifted with relation to the walls of the box 13 and face of the plateholder 21.

To advance or withdraw the box 12 over the racks 11 the handle is placed on the shaft 38 and the latter revolved, whereupon the worm 43 will rotate the worm wheel 46 and shaft 47. With the rotation of the shaft 47 the toothed wheels 50 will turn and cause the angle pieces 48 and box 12 to move axially of the bed of the camera. All possible chance of the box 12 becoming slightly inclined about its vertical axis, to throw the optical axis of the lens at an angle with respect to the center of the sensitive plate, has been overcome, due to the initial propelling force being distributed equally at each edge of the front box 12.

With horizontal movement of the front box 12 the casting 42 supported in the carriage as well as the tie rods 49 and angle pieces 48 will also travel throughout the field of possible movement of the forward box. The lens having being properly focused the latter may need to be centered which sometimes requires both vertical and horizontal movement of the lens. To raise the lens the handle 40 is placed on shaft 53 and the latter rotated, whereupon the bevel gears 56 and 58 and spindle 60 will revolve to move the bracket 70 over the thread 62. In this way the mount 69 will be guided in the guide members 68 and the optical axis of the lens will be moved to its proper position with respect to the focusing center on the ground glass. In a similar manner the horizontal movement of the mount 73 is brought about, except that the handle 40 is placed on the shaft 54, whereupon rotation of the latter will revolve the pinion 79 and move the track 77 with the mount 73 transversely across the longitudinal axis of the camera. Any possible position that may result from the vertically movable mount 69 will in no way interfere with the operation of the pinion 79, due to the square bore in the latter which permits it to travel over the square portion of the upright spindle 63 and still remain under the control of the revolving spindle 63.

Having fully described the present invention and disclosed its mode of operation, what we claim and desire to secure by Letters Patent is:—

1. In a camera of the character described, the combination with relatively adjustable front and back boxes of a closed frame for supporting said boxes, means disposed in the frame for controlling relative longitudinal adjustment of the boxes, and lens board adjusting means carried by the front box rearwardly of its forward extremity and cooperating with the controlling means to enable the said front box to be adjusted to the full capacity of the frame without meeting with obstruction from the said lens board adjusting means.

2. In a camera of the character described, the combination with a camera bed having parallel racks extending substantially the entire length thereof, of a back box adapted to be supported on said bed and in engagement with said racks, a carriage supporting said front box and slidably supported at opposite sides on said bed and provided with gears for engaging said racks, a square rotary shaft extending longitudinally of said bed, and transmission mechanism for rotating said gears carried by said carriage and slidably interengaged with said rotary shaft, whereby uniform parallel movement of said front box with respect to said back box will hold the axes of the two boxes in exact alignment.

3. In a camera of the character described, the combination with a camera bed frame having parallel toothed racks extending longitudinally thereof, of a carriage supporting a front box having the lens mounted therein, gear traction wheels, carried at opposite sides of said carriage and engaged with said racks, a square shaft operating longitudinally of said bed frame, a transmission member mounted in said carriage rearwardly of the front of said box, a counter shaft upon which said gear wheels are mounted, and a worm transmission carried by said transmission member and slidably mounted on said square shaft, whereby said front box may be moved axially of said bed frame without altering the axial travel of the optical axis of the lens.

4. In a camera, the combination of a bed frame, a traveling carriage supported thereon, a front lens box carried by said carriage, relatively movable lensboard mounts within said box and adjacent the front panel thereof, triple parallel square shafts operating longitudinally of said bed frame, and means carried by said carriage and slidably mounted on said square shafts, whereby the mounts may be independently operated with relation to each other and the carriage moved independently and axially of said bed frame.

In testimony whereof we have affixed our signatures.

HOWARD R. HAYS.
WILLIAM CORNELISSEN.